US011928390B2

(12) United States Patent
Mistry et al.

(10) Patent No.: US 11,928,390 B2
(45) Date of Patent: Mar. 12, 2024

(54) SYSTEMS AND METHODS FOR PROVIDING A PERSONALIZED VIRTUAL PERSONAL ASSISTANT

(71) Applicant: Harman International Industries, Incorporated, Stamford, CT (US)

(72) Inventors: Jigar Mistry, Ahmedabad (IN); Aditya Diwakar Ilkal, Banaglore (IN); Ankur Jha, Bangalore (IN); Ankur Tibrewal, Bangalore (IN); Nitya Tandon, Bareilly (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/995,981

(22) PCT Filed: Jun. 23, 2020

(86) PCT No.: PCT/US2020/039189
§ 371 (c)(1),
(2) Date: Oct. 11, 2022

(87) PCT Pub. No.: WO2021/211150
PCT Pub. Date: Oct. 21, 2021

(65) Prior Publication Data
US 2023/0325146 A1 Oct. 12, 2023

(30) Foreign Application Priority Data
Apr. 17, 2020 (IN) .............................. 202041016604

(51) Int. Cl.
*G06F 3/16* (2006.01)

(52) U.S. Cl.
CPC .................................... *G06F 3/167* (2013.01)

(58) Field of Classification Search
CPC ...................................................... G06F 3/167
(Continued)

(56) References Cited

U.S. PATENT DOCUMENTS 7,672,841 B2 * 3/2010 Bennett ............... G06F 16/3344
704/270.1
9,711,148 B1 * 7/2017 Sharifi .................... G10L 17/04
(Continued)

OTHER PUBLICATIONS

Tirumala, S. et al., "A review on Deep Learning approaches in Speaker Identification," Proceedings of the 8th International Conference on Signal Processing Systems, Nov. 21, 2016, Auckland, New Zealand, 6 pages.

(Continued)

*Primary Examiner* — William D Titcomb
(74) *Attorney, Agent, or Firm* — McCoy Russell LLP

(57) ABSTRACT

Embodiments are disclosed for providing an interface with a personalized virtual personal assistant (VPA) via a computing system. The example method comprises assigning a plurality of virtual personal assistant (VPA) instances to a plurality of users, each VPA instance of the plurality of VPA instances operating concurrently. For example, assigning the plurality of VPA instances to the plurality of users may include retrieving a personalized VPA configuration for each user of the plurality of users based on a plurality of audio samples, each of the plurality of audio samples corresponding to a user of the plurality of users.

16 Claims, 8 Drawing Sheets

(58) Field of Classification Search
USPC .......................................................... 715/706
See application file for complete search history.

(56) References Cited

U.S. PATENT DOCUMENTS

| | | | | |
|---|---|---|---|---|
| 10,083,006 | B1* | 9/2018 | Feuz | ................... H04W 4/12 |
| 2010/0057465 | A1* | 3/2010 | Kirsch | ............... G01C 21/3629 |
| | | | | 704/260 |
| 2017/0323639 | A1* | 11/2017 | Tzirkel-Hancock | ... H04R 5/023 |
| 2018/0249274 | A1* | 8/2018 | Lyren | ...................... H04S 7/303 |
| 2019/0079724 | A1* | 3/2019 | Feuz | ...................... G06F 3/167 |
| 2019/0332345 | A1* | 10/2019 | Song | .................... G06F 16/683 |
| 2019/0349683 | A1* | 11/2019 | Anders | .................... H04R 5/04 |
| 2020/0075006 | A1* | 3/2020 | Chen | ........................ G10L 13/00 |
| 2020/0372926 | A1* | 11/2020 | Winton | ............... G10L 21/0216 |
| 2021/0067873 | A1* | 3/2021 | Winton | .................. H04R 1/406 |
| 2021/0204021 | A1* | 7/2021 | Kumar | .................. H04L 65/612 |
| 2021/0279621 | A1* | 9/2021 | Lin | ...................... G06F 16/9024 |
| 2022/0101829 | A1* | 3/2022 | Tandon | ................... G10L 15/08 |
| 2022/0399007 | A1* | 12/2022 | Jose | ........................ G06N 3/045 |

OTHER PUBLICATIONS

ISA European Patent Office, International Search Report and Written Opinion Issued in Application No. PCT/US2020/039189, dated Jan. 20, 2021, WIPO, 13 pages.

* cited by examiner

SYSTEMS AND METHODS FOR PROVIDING A PERSONALIZED VIRTUAL PERSONAL ASSISTANT

CROSS-REFERENCE TO RELATED APPLICATIONS

The present application is a U.S. National Phase of International Patent Application Serial No. PCT/US2020/039189, entitled "SYSTEMS AND METHODS FOR PROVIDING A PERSONALIZED VIRTUAL PERSONAL ASSISTANT," and filed on Jun. 23, 2020. International Patent Application Serial No. PCT/US2020/039189 claims priority to Indian Patent Application No. 202041016604, entitled "SYSTEMS AND METHODS FOR PROVIDING A PERSONALIZED VIRTUAL PERSONAL ASSISTANT," and filed on Apr. 17, 2020. The entire contents of each of the above-referenced applications are hereby incorporated by reference for all purposes.

FIELD

The disclosure relates to the field of computing systems including a virtual personal assistant.

BACKGROUND

Many computing systems, such as smart-speakers and vehicle infotainment systems, may be configured to provide users with an interface with one or more virtual personal assistants. For example, a user of a computing system may interact with at least one virtual personal assistant (VPA) via voice commands, and the computing system may broadcast a response from the VPA via a speaker (e.g., a device comprising an electroacoustic transducer for converting electrical audio signals into sounds). Computing systems that provide access to virtual personal assistants may increase customer satisfaction by increasing ease of use, providing a hands-free interface, and allowing a personalized experience. For example, a VPA may be customized to specific preferences of the user, such as music preferences and audio settings, and may enable the user to interface with other digital applications. Specifically, personalized VPAs may increase customer satisfaction and streamline interactions. However, existing computing systems may not provide a personalized VPA experience to a plurality of users concurrently, which may decrease customer satisfaction. For example, a first user may inadvertently interrupt a second user during a VPA interaction.

SUMMARY

Embodiments are disclosed for a method for a computing system comprising assigning a plurality of virtual personal assistant (VPA) instances to a plurality of users, each VPA instance of the plurality of VPA instances operating concurrently. For example, assigning the plurality of VPA instances to the plurality of users may include retrieving a personalized VPA configuration for each user of the plurality of users based on a plurality of audio samples, each of the plurality of audio samples corresponding to a known user of the plurality of users.

In another embodiment, a method for a computing system comprises: assigning a first personalized virtual personal assistant (VPA) instance to a first user based on a first voice command; assigning a second personalized VPA instance to a second user based on a second voice command, each of the first personalized VPA instance and the second personalized VPA instance operating concurrently on the computing system; and providing an interface with each of the first personalized VPA instance and the second personalized VPA instance via at least one speaker and at least one microphone of the computing system.

Systems for a computing system are also disclosed. An example computing system comprises a plurality of speakers and a plurality of microphones; a VPA system including a plurality of virtual personal assistant (VPA) instances, each VPA instance operating concurrently; a plurality of audio zones, each audio zone including at least one speaker of the plurality of speakers and at least one microphone of the plurality of microphones; a processor communicatively coupled to the computing system; and a storage device storing instructions executable by the processor to: assign the plurality of VPA instances to a plurality of users.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
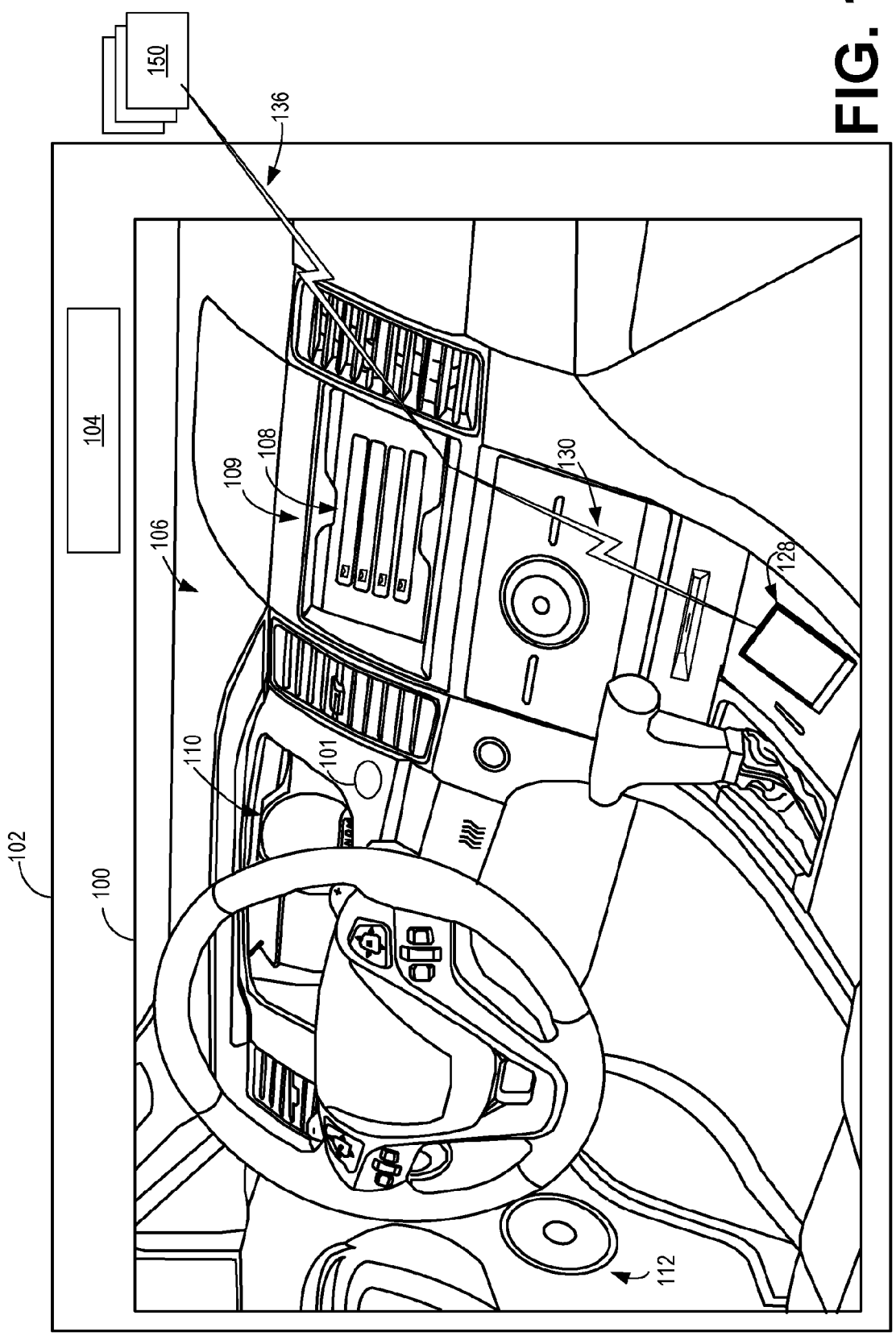
FIG. 1 shows an example partial view of a vehicle cabin in accordance with one or more embodiments of the present disclosure.

As described above, a computing system may assign a plurality of virtual personal assistant (VPA) instances to a plurality of known users, while each of the plurality of VPA instances operates concurrently. For example, the computing system may identify each of the plurality of users based on the output of a neural network, and may configure each VPA instance based on user preferences. In this way, a personalized VPA may be provided to multiple users of a computing system. In some examples, the computing system may be included in a vehicle system with at least one speaker, such as depicted in FIG. 1, so that multiple vehicle passengers may interact with unique VPA instances for a more personalized experience. In other examples, the computing system may be a stand-alone smart speaker, a larger audio system, and so on. As used herein, the term speaker refers to a device comprising at least one electroacoustic transducer for converting electrical audio signals into sound.

FIG. 1 shows an example partial view of one type of environment for a computing system for assigning personalized VPA instances to users: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. IN some examples, in-vehicle computing system 109 may be a local computing system operating on components of vehicle 102, while in other examples, some or all components of in-vehicle computing system 109 may be hosted on a remote server, such as a cloud server. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle computing system. For example, the in-vehicle computing system or the audio system controls may control a volume of audio output, a distribution of sound among the individual speakers of the vehicle computing system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128. As another example, in-vehicle computing system 109 may interface with a virtual personal assistant (VPA) system including a plurality of VPA instances, such as by registering a voice command (e.g., an utterance) from the user and providing a response from one of the plurality of VPA instances via one or more speakers of the vehicle computing system.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, navigation system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
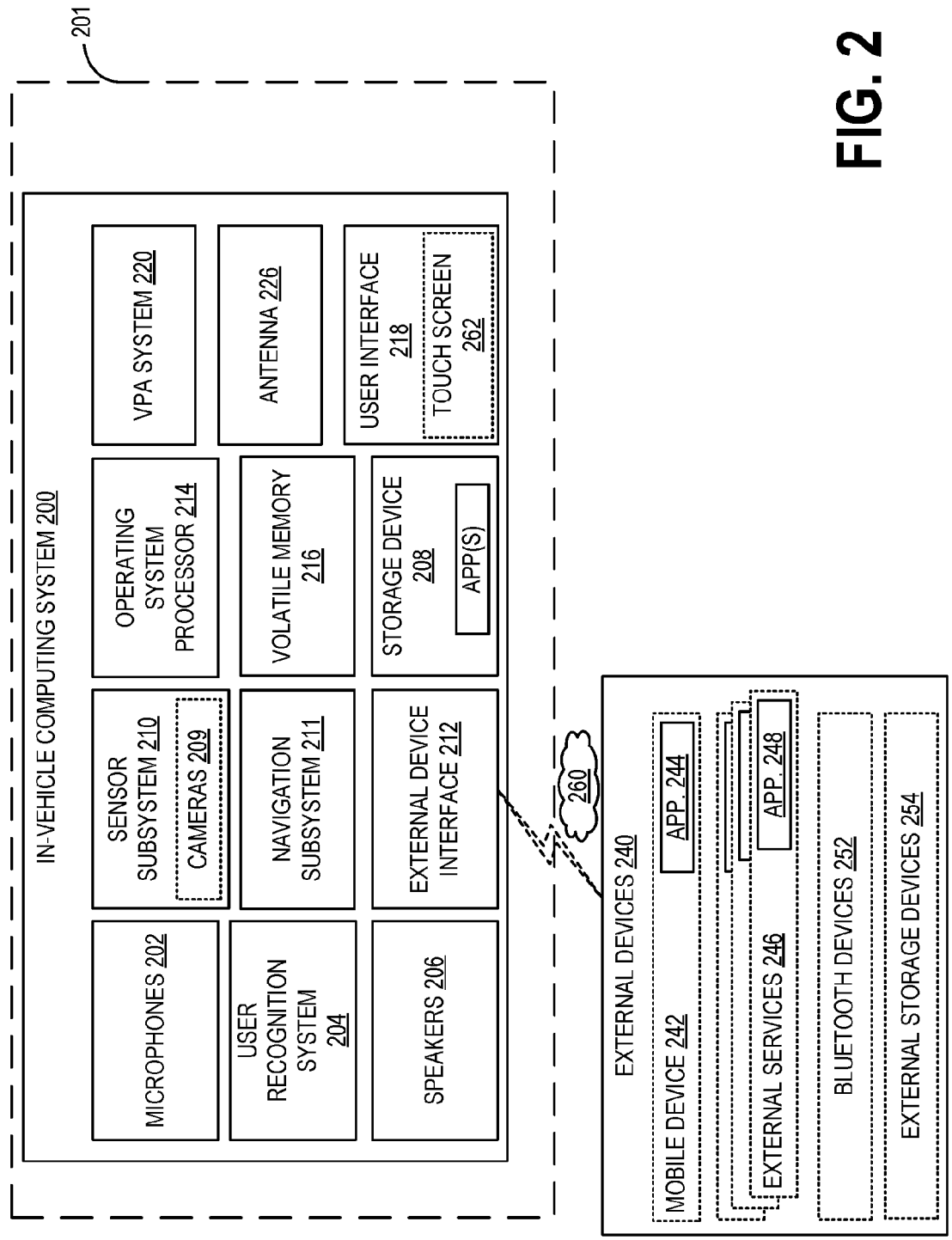
FIG. 2 shows a block diagram of an example in-vehicle computing system of a vehicle, in accordance with one or more embodiments of the present disclosure.

FIG. 2 shows a block diagram of an in-vehicle computing system 200 configured and/or integrated inside vehicle 102. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 102 in order to enhance an in-vehicle experience for a driver and/or a passenger. Further, in some examples, in-vehicle computing system 200 may be hosted at least in part on a cloud-based remote server, so that methods and functions or in-vehicle computing system 200 take place in the cloud-based remote server. As an example, in-vehicle computing system 200 may be hosted exclusively via the cloud-based remote server. As another example, some components of in-vehicle computing system 200 may run on the cloud-based remote server, while other components may be included in vehicle 102. The in-vehicle computing system 200 may be configured to receive inputs via user inputs such as buttons, touch screen, etc., of user interface 218. In particular, user interface 218 may include a touchscreen 262. For example, user interface 218 of in-vehicle computing system 200 may be directly coupled to vehicle 102, while an operating system processor 214 of in-vehicle computing system may be hosted on the cloud-based remote server.

In-vehicle computing system 200 may include one or more processors including the operating system processor 214. Operating system processor 214 may execute an operating system on the in-vehicle computing system, and control input/output, display, playback, and other operations of the in-vehicle computing system.

Further, a non-volatile storage device 208 may be included in in-vehicle computing system 200 to store data such as instructions executable by processor 214 in non-volatile form. The storage device 208 may store application data to enable the in-vehicle computing system 200 to run an application for connecting to a cloud-based server and/or collecting information for transmission to a cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system of the vehicle. In particular, in-vehicle computing system 200 may receive voice commands via microphones 202, which may be processed by a virtual personal assistant (VPA) system 220. VPA system 220 will be described in more detail below with respect to FIG. 3.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc.

External devices 240 may communicate with in-vehicle computing system 200 either wirelessly or via connectors without departing from the scope of this disclosure. For example, external devices 240 may communicate with in-vehicle computing system 200 through the external device interface 212 over a network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices). Further, the one or more applications 248 may provide in-vehicle computing system 200 access to one or more virtual personal assistant applications, as will be elaborated below.

Speakers 206 may include one or more acoustic reproduction devices including electromagnetic transducers such as speakers. Speakers 206 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

In-vehicle computing system 200 may further include an antenna 226. Antenna 226 may be a single antenna, or may comprise one or more antennae in some embodiments. The in-vehicle computing system may obtain broadband wireless internet access via antenna 226, and may further receive broadcast signals such as radio, television, weather, traffic, and the like. The in-vehicle computing system may receive positioning signals such as GPS signals via one or more antennae 226. The in-vehicle computing system may also receive wireless commands via RF such as via antenna(s) 206 or via infrared or other means through appropriate receiving devices. Additionally, antenna 226 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 2, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface. Further, elements of the in-vehicle computing system 200 may be controlled by the user via the VPA system 220, which may enable users to control one or more aspects of in-vehicle computing system via voice commands. For example, a user may use a voice command to change a speaker volume, an audio source, vehicle cabin lighting, and so on. Further, when a vehicle cabin includes more than one user, each user may access a personalized VPA instance in order to increase customer satisfaction. For example, a first user may issue a voice command, and may be answered by a first VPA instance personalized for the first user. Further, a second user may issue a voice command, and may be answered by a second VPA instance personalized for the second user. Further, each VPA instance may operate concurrently, so that each user may interface with a personalized VPA instance substantially simultaneously. In some examples, each user may interact with a VPA instance via a distinct speaker and microphone, as will be elaborated below with respect to FIG. 4.

Figure 3:
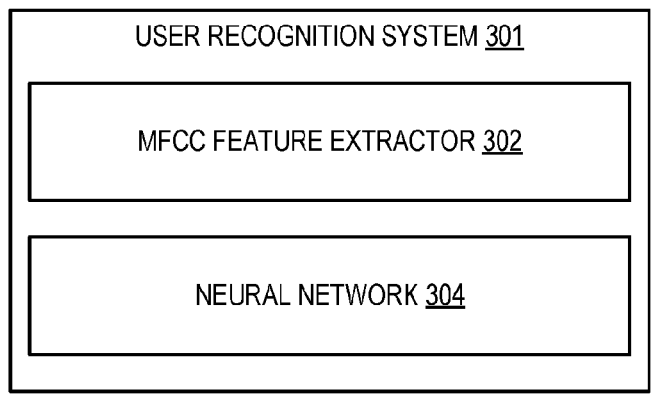
FIG. 3 shows a block diagram of a user recognitions system (URS) and a virtual personal assistant (VPA) of the in-vehicle computing system shown in FIG. 2.
Figure 3:
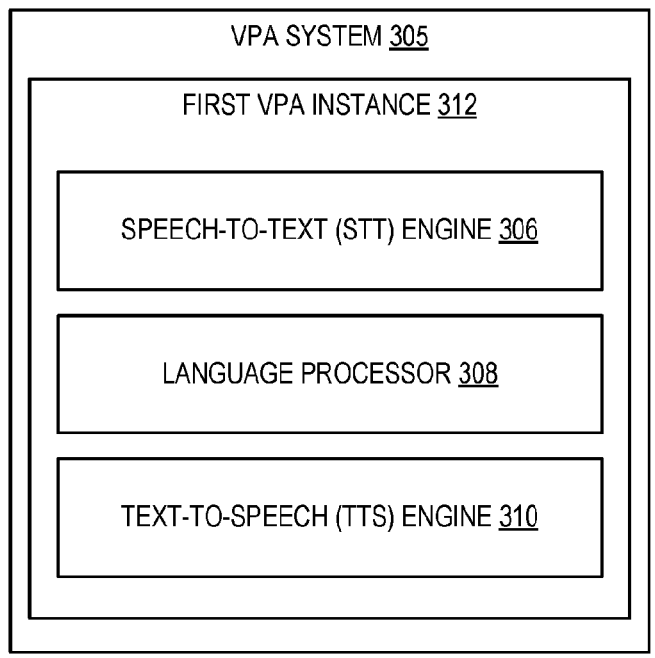

Next, FIG. 3 shows an example block diagram of an URS 301 and a VPA system 305, which may be used in a computing system for providing personalized VPA instances to a plurality of users. For example, URS 301 may be used as URS 204 of computing system 200, shown in FIG. 2, and VPA system 305 may be used as VPA system 220 of computing system 200, shown in FIG. 2. For example, as shown in FIG. 3, URS 301 includes a Mel Frequency Cepstral Coefficient (MFCC) feature extractor 302 for extracting MFCC features from an audio sample, such as a voice command or other spoken input from a vehicle user. For example, MFCC features may describe coefficients of a Mel frequency cepstrum, which is a representation of the short-term power spectrum of a sound wave, based on a nonlinear Mel scale of frequency. The Mel scale adjusts a frequency domain based on perceived frequency (e.g., perceived pitch), which may adjust a sound wave so that vocal differences are more easily isolated. For example, MFCCs may represent phonemes as uniquely shaped by a user's vocal tract. As such, MFCCs of an audio file including a user utterance may be distinct for each user, and thus may be used for identifying users. For example, MFCC feature extractor 302 may extract MFCC features via signal processing of the audio file, as may be appreciated by one skilled in the art of voice recognition. Further, the URS 301 includes a neural network 304 for identifying a user based on MFCC features extracted from the audio sample. For example, the neural network 304 may receive MFCC features extracted by MFCC feature extractor 302 from one or more user voice commands, and may identify the user based on the MFCC features. In this way, URS 204 may identify a user in response to an audio sample, such as a voice command.

Further, VPA system 305 may include a plurality of VPA instances operating in parallel (e.g., concurrently), so that each user of the vehicle system may be assigned to a distinct VPA instance. As such, user may interact with an assigned VPA instance substantially simultaneously without interruption. For example, by providing each user of the vehicle system with a unique VPA instance, a user may interact with a first personalized VPA without interrupting another user's interaction with a second personalized VPA. A first VPA instance 312 of VPA system 305 is shown in FIG. 3, which may be representative of each VPA instance of the plurality of VPA instances. For example, each of the plurality of VPA instances may be configured similarly to the first VPA instance 312 shown in FIG. 3. As shown, the first VPA instance 312 includes a Speech-To-Text (STT) engine 306, a language processor 308, and a Text-To-Speech (TTS) engine 310. The STT engine 306 may convert speech input into text for processing. For example, STT engine 306 may include a trained neural network for converting speech to text, or any other method of converting speech to text known in the art. Further, the language processor 308 may convert the input text, such as produced by STT engine 306, into its corresponding intent and produces an output for the generated intent, according to customizations of a predicted user. For example, language processor 308 may analyze the text of a voice command from a user, as converted by STT engine 306, and determine an intended user input. As an example, a user may employ a variety of phrases to make a functionally identical request, due to the inherent variability of natural language. As such, language processor 308 may translate the natural language employed by the user to a discrete request readable by the first VPA instance 312. In some examples, language processor 308 includes a neural net trained on a plurality of user utterances. Further still, the operation of language processor 308 may be adjusted based on an identified user, as determined by the URS 301. In particular, one or more settings of language processor 308 may be adjusted based on user preferences or other learned user behaviors. Next, the first VPA instance 312 includes TTS 310 for converting a text output from the VPA instance to speech for transmitting to the user. For example, TTS engine 310 may convert a text output of the VPA instance to sound waves, in order to replicate a human voice responding to the user request.

As a non-limiting, illustrative example, VPA system 305 may assign a distinct VPA instance of the plurality of VPA instances to each user identified by URS 301. For example, each VPA instance of the plurality of VPA instances may include a STT engine, a language processor, and a TTS engine. As an example, URS 301 may identify a first user based on a first voice command by analyzing MFCC features of the first voice command (e.g., extracted by MFCC feature extractor 302) with neural network 304. Thus, the first user may be assigned to first VPA instance 312. Further, VPA system 305 may convert the first voice command to text via STT engine 306, determine an intended user input via language processor 308, and convert the first appropriate VPA response from the first VPA instance 312 to audio via TTS engine 310. Next, URS 301 may identify a second user based on a second voice command by analyzing MFCC features of the second voice command with neural network 304, and may assign the second user to a second VPA instance of the plurality of VPA instances (not shown). Then, VPA system 305 may convert the second voice command to text via a STT engine of the second VPA instance, determine an intended user input via a language processor of the second VPA instance, and convert a response from the second VPA instance to audio via a TTS engine of the second VPA instance. In addition to providing a response, each VPA instance of the plurality of VPA instances may cause the computing system to adjust one or more system settings, such as by changing an audio stream played by the computing system, adjusting an audio volume, adjusting a lighting device, adjusting a navigation system setting, and the like. For example, URS 301 and VPA system 305 may be used in conjunction with an in-vehicle system, such as shown in FIG. 2, in order to provide a personalized VPA instance to each of a plurality of vehicle users.

In this way, a computing system may provide a personalized VPA instance to a user using voice recognition. For example, the system may be configured to recognize a plurality of known users, so that the URS 301 may be trained to recognize each of the plurality of known users, and assign a personalized VPA instance (e.g., of VPA system 305) to the known user in response to a voice command from the known user. For example, the neural network 304 of the URS 301 may be trained to recognize users based on voice samples, as will be elaborated below with respect to FIG. 7.

As elaborated above, such a computing system may be included in a vehicle system, such as in-vehicle computing system 200 in vehicle 102 of FIG. 1. Further, in some examples, the computing system may comprise a plurality of audio zones for interacting with the plurality of users, in order to reduce sonic interference between each user of the plurality of users. For example, the plurality of audio zones may define spatial locations of a plurality of speakers and a plurality of microphones included in the computing system. In the example shown in FIG. 4, a vehicle 400, which may be vehicle 102 shown in FIG. 1, is coupled to a computer system including a first audio zone 410, a second audio zone 412, a third audio zone 414, and a fourth audio zone 416. Vehicle 400 further includes a front side 434 and a back side 436. Further, each of the first audio zone 410, the second audio zone 412, the third audio zone 414, and the fourth audio zone 416 may include at least one microphone and at least one speaker. As shown, the first audio zone 410 includes a microphone 418 and a speaker 420. Further, the second audio zone 412 includes a microphone 422 and a speaker 424. Further still, the third audio zone 414 includes a microphone 426 and a speaker 428. Even further, the fourth audio zone 416 includes a microphone 430 and a speaker 432. Further, a first seat 402 of vehicle 400 may be positioned in the first audio zone 410, a second seat 404 may be positioned in the second audio zone 412, a third seat 406 may be positioned in the third audio zone 414, and a fourth seat 408 may be positioned in the fourth audio zone 416. Put differently, vehicle 400, shown in FIG. 3, includes a computing system with four audio zones, with each audio zone at least one microphone and at least one speaker. In some examples, one or more of the speakers or microphones of an audio zone may be fixedly coupled to the seat of the audio zone. For example, speaker 420 and/or microphone 418 may be coupled to seat 402. Additionally or alternatively, speaker 420 and/or microphone 418 may not be coupled to seat 402, and may be mounted to the chassis of vehicle 400, for example. Further, the operation of each of the speakers and each of the microphones may be adjusted based on vehicle operating conditions in order to adjust for vehicle noise. For example, based on vehicle speed, vehicle acceleration, and sensed ambient noise, a speaker volume may be adjusted for each speaker of the vehicle. Further, each speaker may be adjusted differentially, based on an ambient noise in each audio zone.

Based on voice identification performed by a URS (e.g., URS 301 of FIG. 3), the computing system may determine which of the four audio zones a user is positioned in. For example, based on a relative audio signal from each microphone of the vehicle system, the in-vehicle computing system the distance of a user from each microphone, and may determine which of the four audio zones the user is positioned in. For example, a user may be positioned in the first audio zone. When the user in the first audio zone issues a voice command, the computing system may analyze audio gains from each of the first microphone 418, the second microphone 422, the third microphone 426, and the fourth microphone 432, in order to determine a relative signal strength generated by the voice command. For example, the computing system may determine that the user in the first audio zone 410 is closest to the first microphone 418 based on the relative signal strength generated by the voice command for the first microphone, relative to the other microphones.

Further, in some examples, two or more audio zones may be combined into a single audio zone. As an example, the computing system may combine two or more audio zones based on relative strengths of audio signals from the microphones of each of the audio zones. For example, the computing system may compare relative signal strengths of an audio signal from each microphone of the computing system. If the signal strength of an audio signal from a user exceeds a threshold signal strength only for microphones in a single audio zone, the computing system may determine that the user is in the single audio zone. However, if the signal strength of the audio strength from the user exceeds the threshold signal strength for microphones in multiple audio zones, the computing system may determine to combine the relevant audio zones. For example, a user may be positioned at a boundary of two audio zones, and may be substantially equidistant from a microphone for the first audio zone and a microphone for the second audio zone. For example, the controller may infer that a user is using more than one microphone to make requests, and may combine audio zones. As an example, the controller may combine the third audio zone 414 with the fourth audio zone 416, so that a combined audio zone comprises the third microphone 426, the third speaker 428, the fourth microphone 430, and the fourth speaker 432. In some examples, two or more audio zones may be combined in response to a user input. For example, a user may input a request to combine two adjacent audio zones so that the user may interact with additional speakers and microphones.

Figure 4:
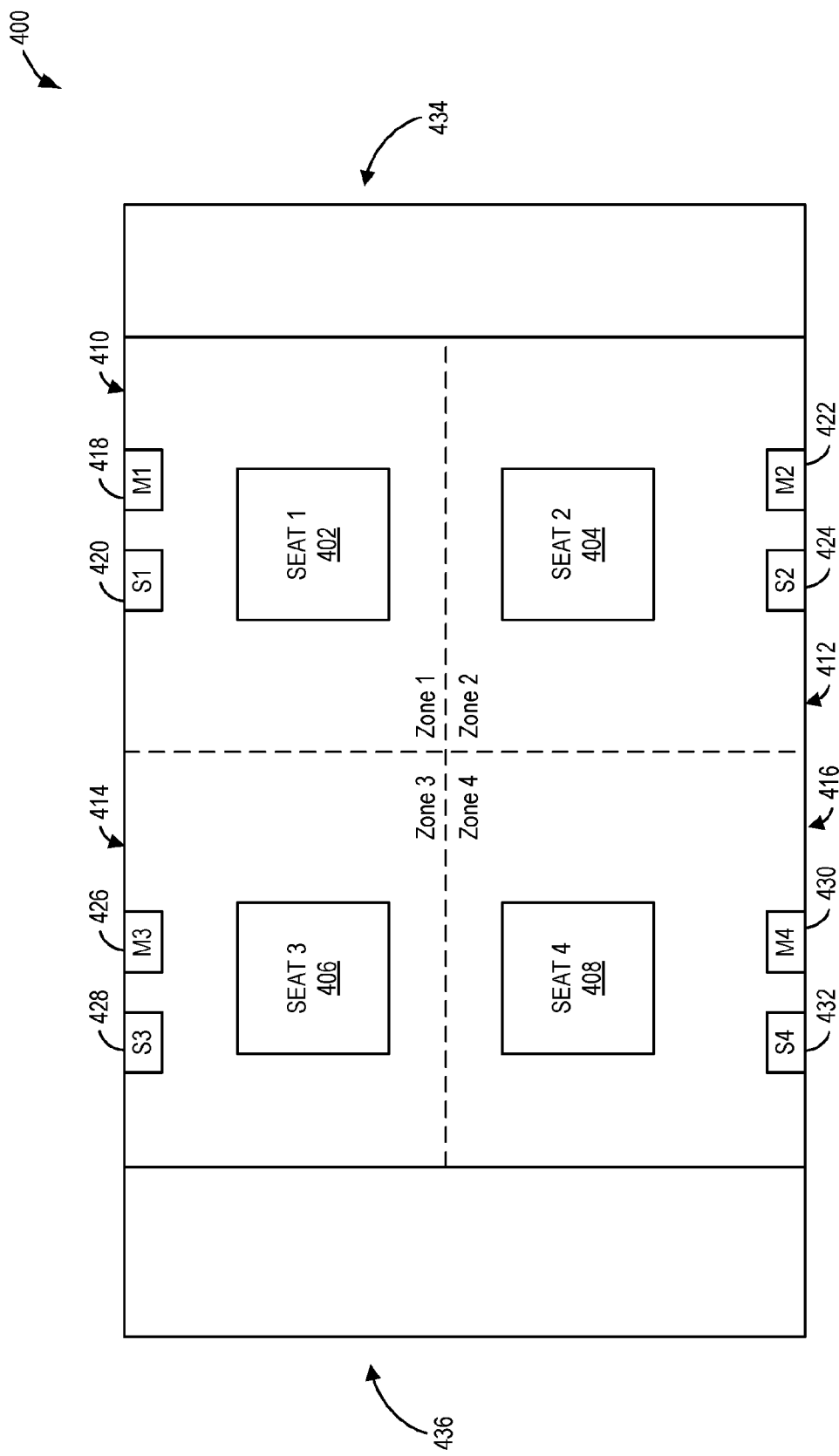
FIG. 4 shows a schematic view of the example vehicle cabin including a plurality of audio zones comprising a plurality of speakers and microphones.

Note that the audio zone configuration shown in FIG. 4 is a non-limiting example audio zone configuration. In other embodiments of the present disclosure, a vehicle may have more or fewer audio zones, and the audio zones may be arranged differently. In some examples, a vehicle may have only one audio zone. Further, as previously stated, such a computing system for assigning a plurality of VPA instances to a plurality of known users may be included in speakers outside of a vehicle system. For example, a room may be divided into at least one audio zone. As an example, a smart speaker (e.g., including a microphone) may have a single audio zone, and may provide a plurality of personalized VPA instances to users. As another example, a non-vehicular structure such as a house may be divided into a plurality of audio zones. As one example, each room of a house may comprise an audio zone, and may include at least one speaker and at least one microphone for providing an interface with a VPA instance.

Figure 5:
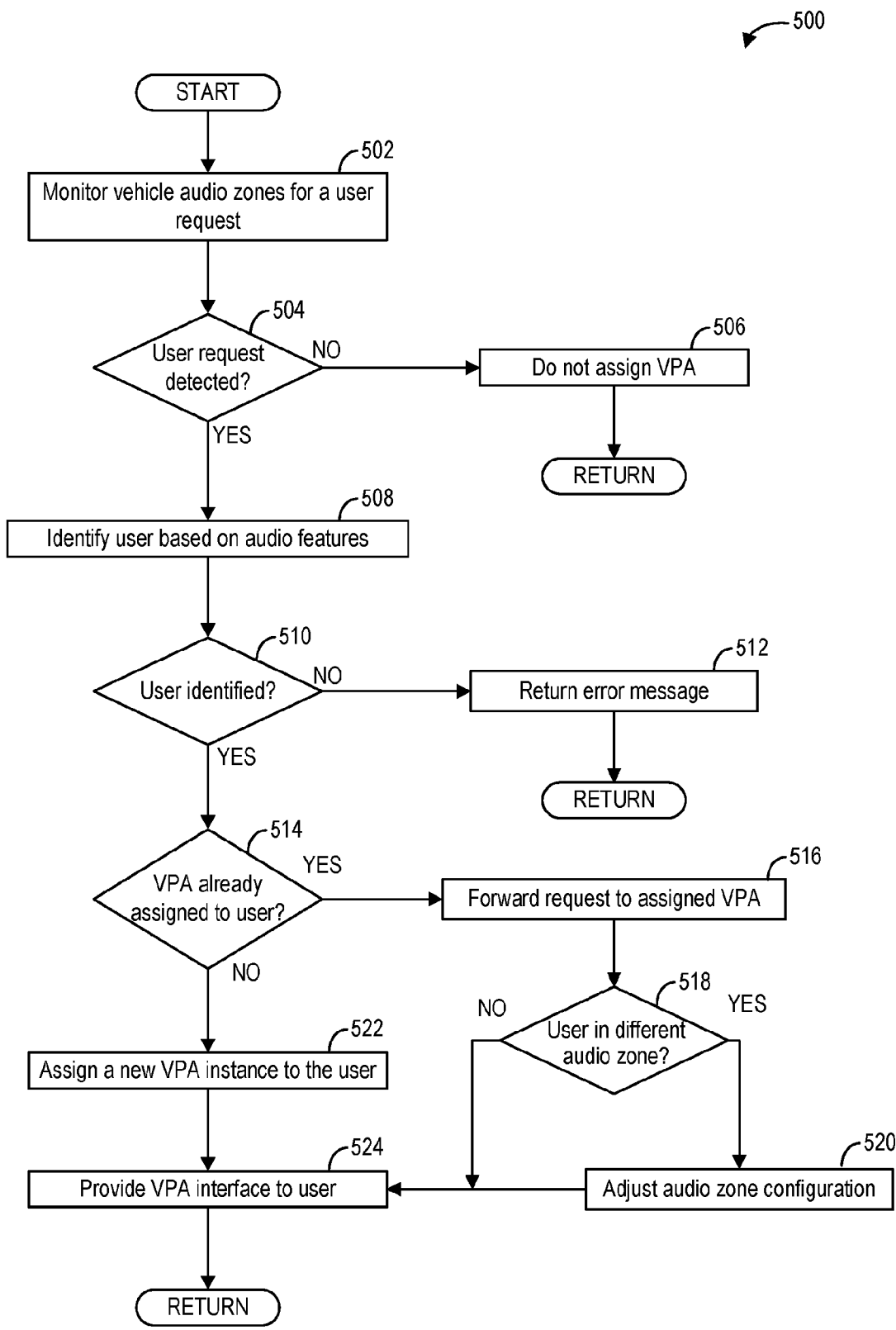
FIG. 5 shows a high-level flow chart illustrating an example method for providing a personalized VPA to at least one user.

Next, a high-level flowchart of an example method 500 for providing a plurality of personalized VPA instance to a plurality of users is shown in FIG. 5. In particular, method 500 is described with respect to the in-vehicle entertainment system of FIGS. 1 and 2, including in-vehicle computing system 200. However, in other examples, method 500 may be carried out by other computing systems. Instructions for carrying out method 500 may be stored in non-transitory memory of the in-vehicle computing system (e.g., storage device 208 shown in FIG. 2). As such, method 500 may be executed by a processor (e.g., operating system processor 214 of FIG. 2) based on the stored instructions and in conjunction with signals received from sensors of the vehicle system such as the sensors described hereinabove with reference to FIGS. 2 and 3.

At step 502, method 400 includes monitoring vehicle audio zones for a user request (e.g., a voice command). For example, the controller may monitor microphones of the computing system for voice commands. As an example, the controller may analyze any user utterances detected by the microphones to determine whether the user has issued a voice command. In particular, some user utterances may not be voice commands, and may not be interpreted as a user request.

At step 504, method 400 includes determining whether a user request is detected. For example, when a voice command is detected via one or more microphones coupled to the vehicle computing system, the controller may determine that a user request is detected.

If a user request is not detected at step 504 ("NO"), method 500 proceeds to 506 and includes not assigning a VPA to a user. For example, the controller may not select a VPA instance to assign to a user based on voice identification. After 506, method 500 may return. For example, method 500 may return and continue to monitor the vehicle cabin for a voice command.

If a user request is detected at step 504 ("YES"), method 500 proceeds to 508 and includes identifying the user based on audio features, such as MFCC features. For example, the user request may be processed by a URS of the controller (e.g., such as shown in FIGS. 2 and 3). For example, a MFCC extractor of the URS may process an audio signal associated with the voice command in order to extract a plurality of MFCC features characterizing the audio signal. Further, the MFCC features may be input into the neural network of the URS, which may match the extracted MFCC features of the audio signal to one of a plurality of known users. For example, the neural network may be trained on audio samples from each of the plurality of known users, and may compare extracted MFCC features of the audio signal to the learned MFCC features of the plurality of known users, as is elaborated below with respect to FIG. 8. If the neural network does not match the audio sample to one of the plurality of known users, the neural network may output an error message or another indication that a user was not identified. Further, the controller may determine which audio zone the user request originated in.

At step 510, method 500 includes determining whether a user was identified. For example, based on an output from the neural network, the controller may determine whether a user was identified. For example, if the neural network outputs an identified user, the controller may determine that a user was identified. However, if the neural network outputs an error message or an indication that a user was not identified, the controller may determine that a user was not identified. For example, the neural network may be trained to identify a set of known users based on extracted MFCC features. However, in response to a voice command from a user not included in the set of known users, the neural network may fail to identify the user.

If method 500 determines that a user was not identified at step 510 ("NO"), method 500 continues to step 512 and includes returning an error message to the user. For example, the error message may prompt the user to register their voice for user with the personalized VPA system. As an example, the controller may notify the user via pop-up notification on a display in the vehicle system, or may output an audio alert that the user was not identified. For example, the controller may prompt the user to register their voice by providing audio samples for training the neural network of the URS to recognize the user as one of the set of known users.

If method 500 determines that a user was identified at step 510 ("YES"), method 500 continues to step 514 and includes determining whether a VPA instance is already assigned to the identified user. For example, the controller may determine whether the identified user has already issued a voice command and been assigned to a VPA instance. For example, the controller may query each VPA instance of the VPA in order to determine whether any VPA instance is already assigned to the user.

If method 500 determines at step 514 that the VPA is not already assigned to a user ("NO"), method 500 continues to step 522 and includes assigning a new VPA instance to the user. For example, the controller may select a first VPA instance of a plurality of VPA instances and assign the VPA instance to the user.

At step 524, method 500 includes providing a VPA interface to the user. For example, based on stored user preferences and features of the voice command, the controller may provide the user request to the assigned VPA instance and broadcast a VPA response over one or more speakers of the vehicle system. In particular, the controller may broadcast the VPA response over a speaker for the user's audio zone. After 524, method 500 may end.

If method 500 determines at step 514 that a VPA instance is already assigned to a user ("YES"), method 500 continues to 516 and includes forwarding the user request to the assigned VPA instance. For example, the controller may forward the user request to the VPA instance already assigned to the user.

At step 518, method 500 includes determining whether the user is in a different audio zone, relative to the last user request. For example, a previous request from the identified user may have originated in a first audio zone, while a current request from the identified user may have originated in a second audio zone.

If method 500 determines at step 518 that the user request originated in a different audio zone, method 500 continues to step 520 and includes adjusting the audio zone configuration. For example, the controller may merge the first audio zone and the second audio zone together, so that the user may interface with microphones and speakers from each of the two audio zones in order to interact with their assigned VPA instance. As a non-limiting example, if the user has issues voice commands from the first audio zone and the second audio zone, the controller may adjust the audio zone configuration such that the first audio zone and the second audio zone form a single combined audio zone, the single combined audio zone comprising the speaker and the microphone from each of the first audio zone and the second audio zone. Method 500 may then proceed to step 524 as elaborated above.

If method 500 determines at step 518 that the user is not located in a different audio zone ("NO"), and is instead located in the same audio zone, method 500 proceeds to step 524 and includes providing a VPA interface to the user, as described above. After step 524, method 500 may end.

Figure 6:
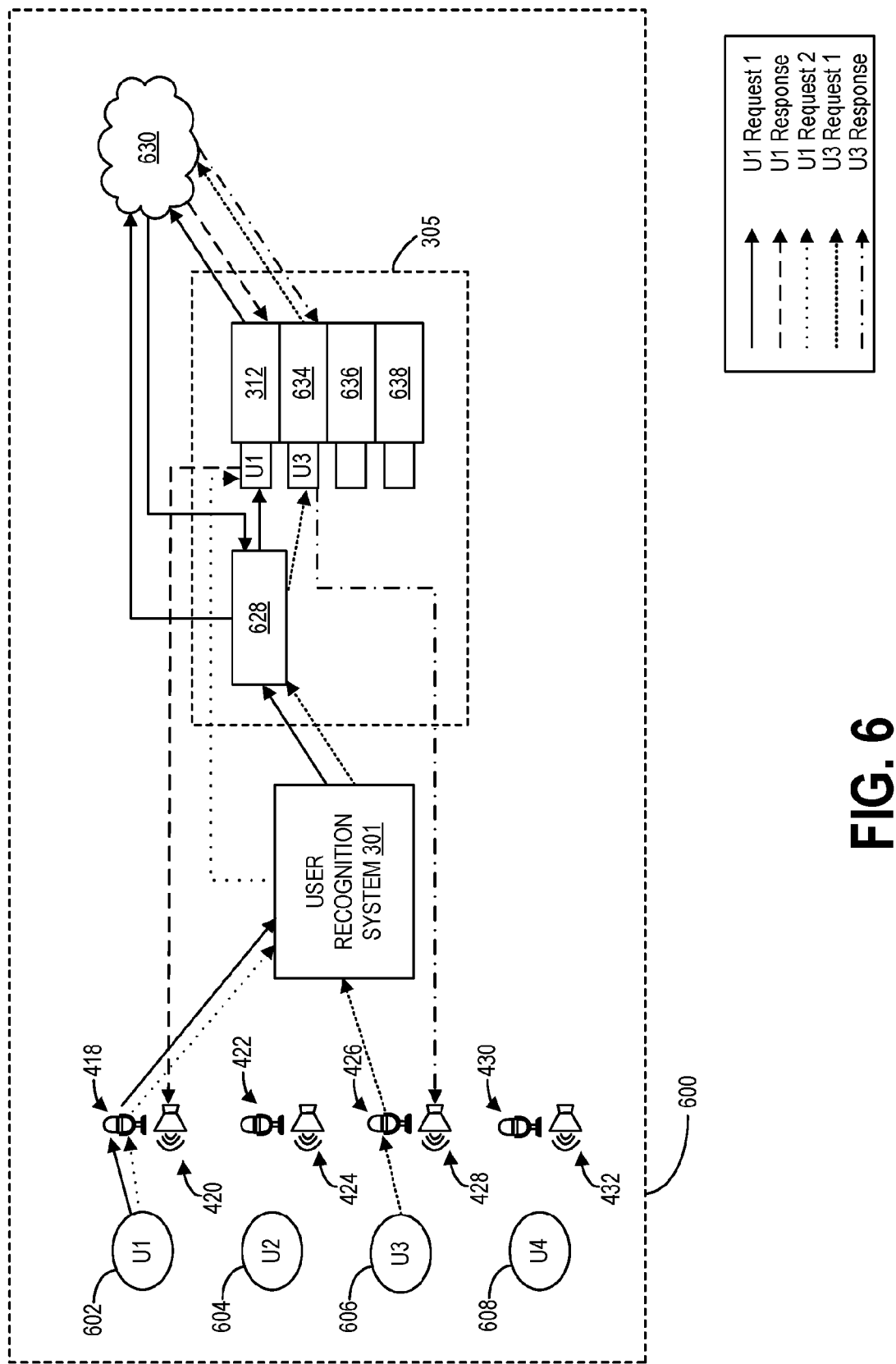
FIG. 6 shows a schematic representation of an example interaction between a plurality of vehicle users and the in-vehicle computing system, including the URS and the VPA shown in FIG. 3.

Next, FIG. 6 shows a schematic representation of a computing system 600, providing a personalized VPA instance to a plurality of users, according to method 500 of FIG. 5. For example, computing system 600 comprises four audio zones, such as shown in FIG. 4. As such, audio zone components shown in FIG. 4 will be numbered the same and not reintroduced. For example, a first user 602 may be positioned in the first audio zone including first microphone 418 and first speaker 420; a second user 604 may be located in the second audio zone including second microphone 422 and second speaker 424; a third user 606 may be positioned in the third audio zone including third microphone 426 and third speaker 428; and a fourth user 608 may be positioned in the fourth audio zone including fourth microphone 430 and fourth speaker 432.

Computing system 600 includes URS 301 of FIG. 3, which may be communicatively coupled to each microphone of the system. Further, computing system 600 includes VPA system 305 of FIG. 3, including an authentication block 628 for retrieving personalized user configurations from a remote server 630, and four VPA instances, including the first VPA instance 312, a second VPA instance 634, and third VPA instance 636, and a fourth VPA instance 638. Each VPA instance of the plurality of VPA instances may include a STT engine, a language processor, and a TTS engine. For example, as shown in FIG. 3, the first VPA instance 312 includes STT engine 306, language processor 308, and TTS engine 310. Audio input from each of the four microphones may be directed to URS 301, which may identify a user based on extracted audio features before sending the audio input to VPA system 305. For example, the audio input may be a voice command for a VPA, such as a request for music, a navigation command, an informational request, a schedule request, and the like.

In the example of FIG. 6, the first user 602 (e.g., U1) makes a first request (e.g., U1 Request 1), which is transmitted via the first microphone 418 to URS 301. URS 301 may identify the first user as one of a plurality of known users based on audio features of the first request (e.g., such as extracted MFCC features), and may route the request to authentication block 628 of VPA system 301. For example, the authentication block determines that a VPA instance has not already been assigned to first user 602, and retrieves a personalized VPA configuration for the first user from the remote server 630. Next, VPA system 301 may assign the first user 602 to a first VPA instance 312. For example, the first VPA instance 312 may be adjusted based on the personalized VPA configuration for the first user retrieved from the remote server 630. Next, in response to the first request (solid line 640), the first VPA instance 312 may formulate a response (e.g., U1 Response), and route the response to first speaker 420. First speaker 420 may broadcast the VPA response to the first user, thus providing a personalized VPA instance to the first user. The VPA response may further include adjusting one or more settings computing system 600, such as a speaker volume, a selected audio stream, a navigation path, and the like Further, the first user makes a second request (e.g., U1 Request 2), which may be captured by the first microphone 418 and be routed to URS 301. For example, URS 301 recognizes that the second request was made by the first user based on audio features of the second request. Further, because the first user has already been authenticated by authentication block 628 (e.g., in response to the first request), the second request may be routed directly to the first VPA instance 312, bypassing authentication block 628 and cloud server 630. Such a pattern of request and response between the first user and the first VPA instance may continue, even while additional vehicle users initiate interactions with the VPA.

For example, as shown, the third user 606 (e.g., U3) makes a request (e.g., U3 Request 1), which is captured by the third microphone 426 and routed to URS 301. As an example, the third user 606 may make a request substantially simultaneously with the first user 602 making a second request, so that each request is processed concurrently. Similar to the first request (e.g., U1 Request 1), request from the third user (e.g., U3 Request 1) may be passed to authentication block 628 after URS 301 identifies the user. Authentication block 628 may retrieve a VPA configuration for the third user from remote server 630, and the third user 606 may be assigned to a second VPA instance 634. In response to the request from the third user 606, the second VPA instance 634 formulates a response (e.g., U3 Response), which is broadcast to the third user 606 via speaker 428. Further, VPA system 301 may adjust one or more settings of the computing system 600 based on the request from the third user 606. In this way, as shown in FIG. 6, a computing system may provide a plurality of users with a plurality of VPA instances, each VPA instance operating concurrently. For example, the first user may interact with the assigned VPA instance without interrupting the second user's VPA interactions.

Figure 7:
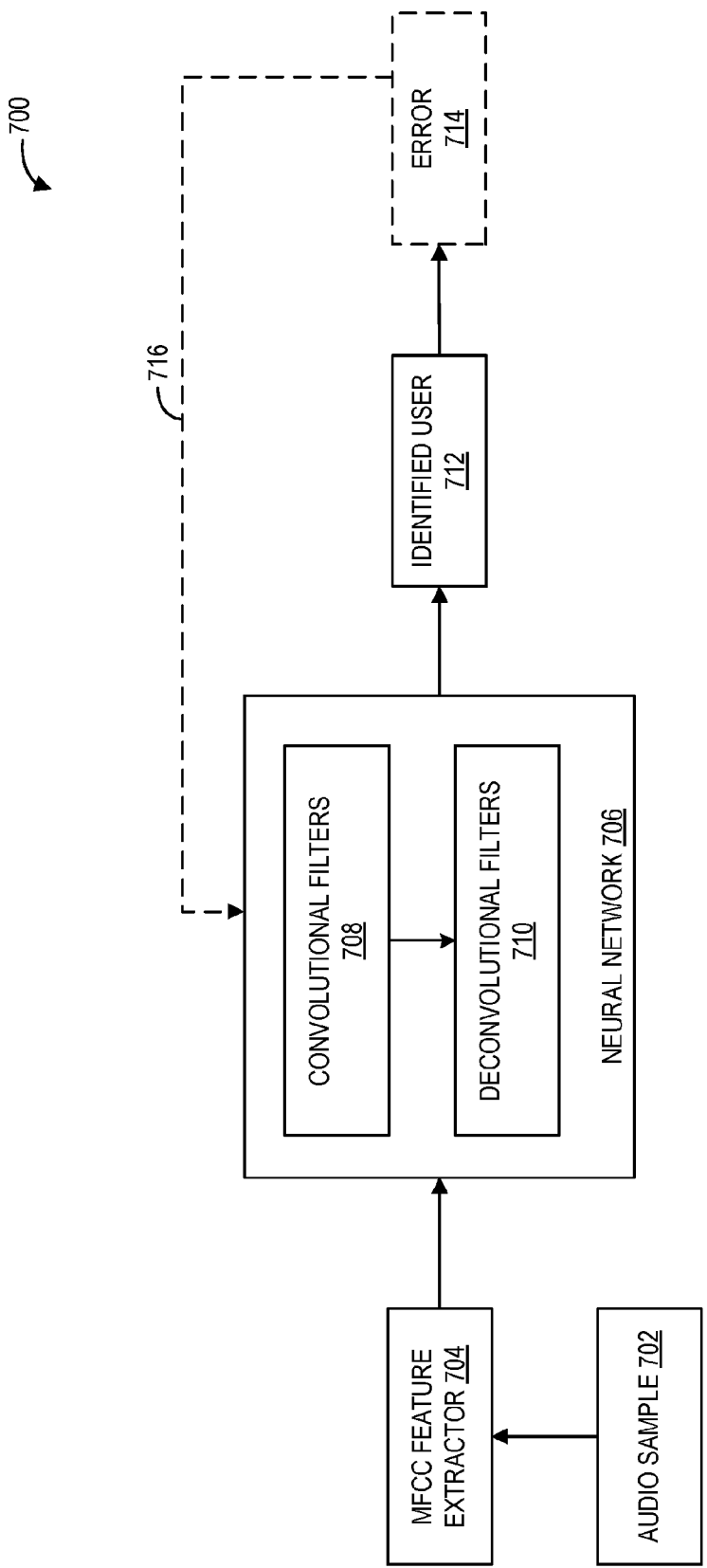
FIG. 7 shows a block diagram illustrating an example neural network for identifying a registered user based on extracted audio features.

Further, FIG. 7 shows a schematic of an embodiment of a user identification process 700 for identifying a user of a computing system based on an audio sample, such as a voice command. For example, user identification process 700 may be executed by an in-vehicle computing system to identify a user, in order to assign a personalized VPA instance to the user. For example, user identification process 700 may be executed by a processor, such as operating system processor 214 of FIG. 2, and a user recognition system, such as URS 301 of FIGS. 2 and 3. As shown in FIG. 7, user identification process 700 receives an audio sample as an input. The audio sample may be a voice command or other spoken user request received via a microphone, as an example. In other examples, the audio sample may be an audio sample recorded by a new user for training the neural network to recognize the user. Further, user identification process 700 includes an MFCC feature extractor 704 for extracting MFCC features from the audio sample. For example, MFCC feature extractor 704 may be MFCC feature extractor 302 described with respect to FIG. 3. For example, MFCC feature extractor 704 extracts features from audio sample 702, and inputs these features to a neural network 706.

As shown, neural network 706 receives MFCC features of audio sample 702 as an input, and identifies a user (e.g., an identified user 712) as an output. Thus, the input (e.g., audio sample 702) is mapped to the identified user 712. Neural network 706 comprises learned convolutional filters 708 (learned and/or updated during a training mode) and learned deconvolutional filters 710 (learned and/or updated during a training mode). By propagating inputs through the convolutional and deconvolutional layers of neural network 706, the identified user 712 is output. For example, the neural network may be trained on audio samples from a discrete set of known users, and may match the MFCC features extracted from audio sample 702 to one of the users of the discrete set of known users. If the neural network does not identify a user from the discrete set of known users, neural network 706 may instead output an error message to the user. Neural network 706 may further comprise one or more densely connected layers (not shown), and one or more pooling layers (not shown), one or more up sampling layers (not shown), and one or more ReLU layers (not shown), or any layers conventional in the art of machine learning.

Further, while user identification process 700 operates in a training mode, an identified user 712 may be compared to a known user in order to determine an error 714 of the system. For example, the error 714 may be back-propagated through the convolutional and deconvolutional filters of neural network 706, adjusting the weights and balances of the filters in order to increase the neural network accuracy until the error 714 converges. For example, a method for operating user identification process 700 in a training mode in order to train neural network 706 is shown below with respect to FIG. 8.

Figure 8:
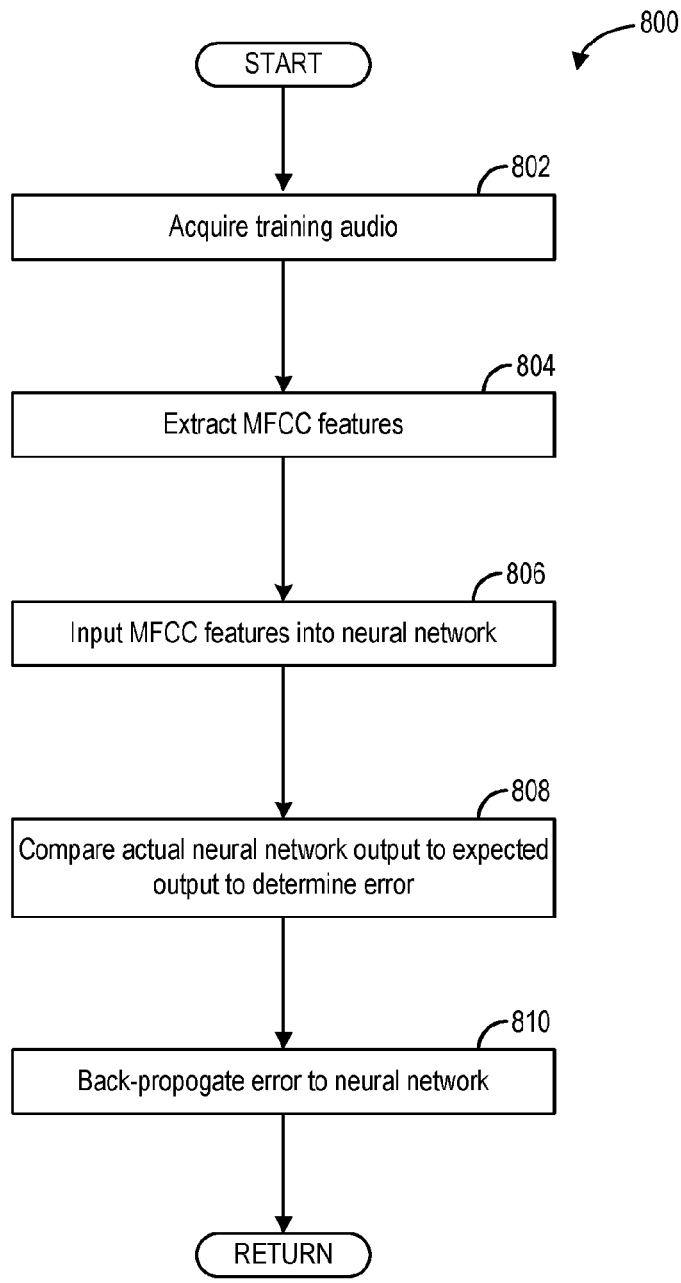
FIG. 8 shows a high-level flow chart illustrating an example method for training a neural network, such as the neural network shown in FIG. 7, to identify a registered user based on extracted audio features.

Thus, FIG. 8 shows a high-level flowchart of an example method 800 for training a neural network to identify a user based on audio from vehicle system users. Method 800 may be executed by one or more of the systems discussed above. For example, in some embodiments, method 800 may be implemented by the in-vehicle communication system 200 shown with respect to FIG. 2, including neural network 304 shown with respect to FIG. 3.

At step 802, method 800 includes acquiring training audio. For example, a user may provide a plurality of audio samples to the vehicle system, such as recordings of sample voice commands for training the neural network. For example, a new user of the vehicle system may be prompted by a user interface to record a plurality of audio samples. The audio samples may be selected to efficiently train the neural net to identify users based on voice commands, for example. Each of the plurality of audio samples may be indexed to an identifier for the new user.

At step 804, method 800 includes extracting MFCC features from the training audio via an MFCC extractor, such as the MFCC extractor 302 described with respect to FIG. 3. For example, the MFCC extractor may extract MFCC features from each of the plurality of audio samples via one or more signal processing techniques. For example, the MFCC extractor may output a plurality of sets of MFCC features, each indexed to the identifier for the new user.

At step 806, method 800 includes inputting the MFCC features into a neural network. For example, each MFCC feature of the plurality of sets of MFCC features may be input to the neural network, and may be mapped to an identified user.

At step 808, method 800 includes comparing the actual neural network output to the expected output. For example, for each audio sample input, method 800 may compare the identified user (e.g., identified at 806) with the identifier for the new user indexed to the audio sample input.

At step 810, method 800 includes back-propagating error in the neural network. For example, a difference metric between the predicted identified user and the identifier for the new user is calculated by the neural network, thus determining an error of the predicted identified user relative to the actual identified user. In some embodiments, the difference metric may comprise one or more, or a weighted combination of, a DICE score, a mean square error, an absolute distance error, and an angle error. In some embodiments, training the deep neural network further includes determining a difference between each output from each output neuron of the deep neural network, and a corresponding value in the ground-truth image. Further, the weights and biases of the deep neural network are adjusted based on the difference metric. The difference metric may be back-propagated through the layers of the deep neural network to update the weights (and biases) of the layers. In some embodiments, back-propagation of the loss may occur according to a gradient descent algorithm, or another method of back-propagation known in the art.

After step 810, method 800 returns. It will be noted that step 810 may be repeated until the weights and biases of the neural network converge, a threshold difference metric is obtained (for the training data or on a separate validation dataset), or the rate of change of the weights and/or biases of the deep neural network for each iteration are under a threshold. Thus, method 800 enables a deep neural network of a URS to be trained to identify users based on an audio sample (e.g., such as a voice command).

In this way, a computing system may assign a plurality of personalized VPA instances to a plurality of known users, each VPA instance of the plurality of VPA instances operating concurrently. For example, because each known user is assigned an independent VPA instance operating concurrently with the other VPA instances, a user may interact with an assigned VPA instance without interruption from another user, which may increase ease of use and customer satisfaction. In particular, each user may be identified via a user recognition system including a trained neural network, and may assigned to a unique VPA instance. By providing each user with a personalized VPA instance, VPA interactions may be tailored to each individual user, such as music preferences, digital accounts, speech patterns, schedule, saved information, and the like. In some examples, the computing system may be included in a vehicle system. By including a computing system for assigning personalized VPA instances in a vehicle system, a user may control vehicle functions in a hands-free fashion, which may increase customer satisfaction and product desirability.

A technical effect of the disclosure includes the control of a computing system by multiple users. For example, by assigning a plurality of VPA instances to a plurality of users, with each VPA instance operating concurrently, multiple users may control the computing system via voice commands without interruption, each user interacting with a personalized VA instance configured for the user.

As an example, a method for a computing system comprises: assigning a plurality of virtual personal assistant (VPA) instances to a plurality of users, each VPA instance of the plurality of VPA instances operating concurrently. In the preceding example, additionally or optionally, assigning the plurality of VPA instances to the plurality of users includes retrieving a personalized VPA configuration for each user of the plurality of users based on a plurality of audio samples, each of the plurality of audio samples corresponding to a known user of the plurality of users. In one or both of the preceding examples, additionally or optionally, retrieving the personalized VPA configuration for each known user of the plurality of users based on the plurality of audio samples includes: identifying each user of the plurality of users based on the plurality of audio samples; and responsive to identifying a user of the plurality of users, retrieving the VPA configuration corresponding to the identified user from a set of stored VPA configurations. In any or all of the preceding examples, the method additionally or optionally further includes: responsive to not identifying a user, outputting an error message via a user interface. In any or all of the preceding examples, additionally or optionally, the plurality of audio samples comprises a plurality of voice commands from the plurality of users. In any or all of the preceding examples, additionally or optionally, identifying each user of the plurality of users based on the plurality of audio samples includes: extracting a plurality of Mel Frequency Cepestral Coefficient (MFCC) features from each of the plurality of audio samples; and inputting the plurality of MFCC features from each of the plurality of audio samples into a trained deep neural network. In any or all of the preceding examples, additionally or optionally, each of the plurality of users is located in one of a plurality of audio zones, each audio zone comprising at least one speaker and at least one microphone. In any or all of the preceding examples, additionally or optionally, assigning the plurality of VPA instances to the plurality of users includes identifying each user of the plurality of users based on at least one user input via a user interface.

As another example, a method for a computing system comprises: assigning a first personalized virtual personal assistant (VPA) instance to a first user based on a first voice command; assigning a second personalized VPA instance to a second user based on a second voice command, each of the first personalized VPA instance and the second personalized VPA instance operating concurrently on the computing system; and providing an interface with each of the first personalized VPA instance and the second personalized VPA instance via at least one speaker and at least one microphone of the computing system. In the preceding example, additionally or optionally, assigning the first personalized VPA instance to the first user based on the first voice command includes: mapping the first voice command to one of a plurality of known users via a trained neural network; and responsive to mapping the first voice command to a first known user of the plurality of known users, acquiring a VPA configuration for the first known user. In one or both of the preceding examples, additionally or optionally, assigning the second personalized VPA instance to the second user based on the second voice command includes: mapping the second voice command to one of the plurality of known users via the trained neural network; and responsive to mapping the second voice command to a second known user of the plurality of known users, acquiring a VPA configuration for the second known user. In any or all of the preceding examples, additionally or optionally, the computing system comprises a first audio zone and a second audio zone, the first audio zone including a first microphone and a first speaker, and the second audio zone including a second microphone and a second speaker. In any or all of the preceding examples, the method additionally or optionally further comprises: measuring a first audio signal strength corresponding to an audio signal of the first microphone from the first voice command and a second audio signal strength corresponding to an audio signal of the second microphone from the first voice command; responsive to the first audio signal strength exceeding a threshold value and the second audio signal strength not exceeding the threshold value, assigning the first user to the first audio zone; responsive to the first audio signal strength not exceeding the threshold value and the second audio signal strength exceeding the threshold value, assigning the first user to the second audio zone; and responsive to each of the first audio signal strength and the second audio signal strength exceeding the threshold value, combining the first audio zone with the second audio zone. In any or all of the preceding examples, the method additionally or optionally further comprises: measuring a third audio signal strength corresponding to an audio signal of the first microphone from the second voice command and a fourth audio signal strength corresponding to an audio signal of the second microphone from the second voice command; responsive to the third audio signal strength exceeding the threshold value and the fourth audio signal strength not exceeding a threshold value, assigning the second user to the first audio zone; responsive to the third audio signal strength not exceeding the threshold value and the fourth audio signal strength exceeding the threshold value, assigning the second user to the second audio zone; and responsive to each of the third audio signal strength and the fourth audio signal strength exceeding the threshold value, combing the first audio zone with the second audio zone. In any or all of the preceding examples, additionally or optionally, the computing system is coupled to a vehicle system, and one or more speaker settings of the computing system is adjusted based on an input from the vehicle system, such as a vehicle speed, an ambient noise, and a vehicle location.

As yet another example, a computing system comprises: a plurality of speakers and a plurality of microphones; a VPA system including a plurality of virtual personal assistant (VPA) instances, each VPA instance operating concurrently; a plurality of audio zones, each audio zone including at least one speaker of the plurality of speakers and at least one microphone of the plurality of microphones; a processor communicatively coupled to the computing system; and a storage device storing instructions executable by the processor to: assign the plurality of VPA instances to a plurality of users. In the preceding example, additionally or optionally, the computing system further comprises: a user recognition system (URS) including an MFCC feature extractor and a neural network for identifying a user based on an audio sample; a virtual personal assistant (VPA) system including a speech-to-text (STT) engine, a language processor, and a text-to-speech (TTS) engine, and the plurality of VPA instances. In one or both of the preceding examples, additionally or optionally, the processor contains further instructions stored in non-volatile memory that, when executed, cause the processor to: assign a first VPA instance of the plurality of VPA instances to a first user of the plurality of users based on a voice command; retrieve a VPA configuration for the first user from a remote server; and broadcast a response from the first VPA instance via a speaker of the plurality of speakers. In any or all of the preceding examples, additionally or optionally, the computing system is communicatively coupled to at least one external device. In any or all of the preceding examples, additionally or optionally, the at least one external device includes one of a cloud-based service, a mobile phone, a tablet computer, a laptop computer, a desktop computer, a smart watch, a pair of smart glasses, and a server hosting one or more proprietary applications.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the telematics unit 30 described with reference to FIG. 1. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for a computing system, comprising:
assigning a plurality of virtual personal assistant (VPA) instances to a plurality of users, each VPA instance of the plurality of VPA instances operating concurrently;
monitoring a plurality of audio zones for a user request;
determining, of the plurality of audio zones, an audio zone in which the user request originated, based on an audio signal strength; and
broadcasting a VPA response to the user request over one or more speakers for the audio zone in which the user request originated.

2. The method of claim 1, wherein assigning the plurality of VPA instances to the plurality of users includes retrieving a personalized VPA configuration for each user of the plurality of users based on a plurality of audio samples, each of the plurality of audio samples corresponding to a known user of the plurality of users.

3. The method of claim 2, wherein retrieving the personalized VPA configuration for each user of the plurality of users based on the plurality of audio samples includes:
identifying each user of the plurality of users based on the plurality of audio samples; and
responsive to identifying each user of the plurality of users, retrieving the personalized VPA configuration corresponding to the identified user from a set of stored personalized VPA configurations.

4. The method of claim 3, further including:
responsive to not identifying a user of the plurality of users, outputting an error message via a user interface.

5. The method of claim 3, wherein the plurality of audio samples comprises a plurality of voice commands from the plurality of users, each voice command of the plurality of voice commands corresponding to a user of the plurality of users.

6. The method of claim 3, wherein identifying each user of the plurality of users based on the plurality of audio samples includes:
extracting a plurality of Mel Frequency Cepstral Coefficient (MFCC) features from each of the plurality of audio samples; and
inputting the plurality of MFCC features from each of the plurality of audio samples into a trained deep neural network.

7. The method of claim 1, wherein each of the plurality of users is located in one of the plurality of audio zones, each audio zone comprising at least one speaker and at least one microphone.

8. The method of claim 7, wherein the plurality of audio zones comprises a first audio zone and a second audio zone, the first audio zone including a first microphone and a first speaker, and the second audio zone including a second microphone and a second speaker.

9. The method of claim 8, further comprising:
measuring a first audio signal strength corresponding to a first audio signal of the first microphone from a first voice command and a second audio signal strength corresponding to a second audio signal of the second microphone from the first voice command;
responsive to the first audio signal strength exceeding a threshold value and the second audio signal strength not exceeding the threshold value, assigning a first user to the first audio zone;
responsive to the first audio signal strength not exceeding the threshold value and the second audio signal strength exceeding the threshold value, assigning the first user to the second audio zone;
responsive to each of the first audio signal strength and the second audio signal strength exceeding the threshold value, combining the first audio zone with the second audio zone;
measuring a third audio signal strength corresponding to a third audio signal of the first microphone from a second voice command and a fourth audio signal strength corresponding to a fourth audio signal of the second microphone from the second voice command;
responsive to the third audio signal strength exceeding the threshold value and the fourth audio signal strength not exceeding the threshold value, assigning a second user to the first audio zone;
responsive to the third audio signal strength not exceeding the threshold value and the fourth audio signal strength exceeding the threshold value, assigning the second user to the second audio zone; and
responsive to each of the third audio signal strength and the fourth audio signal strength exceeding the threshold value, combing the first audio zone with the second audio zone.

10. The method of claim 9, wherein the computing system is coupled to a vehicle system, and one or more speaker settings of the computing system is adjusted based on an input from the vehicle system, such as a vehicle speed, an ambient noise, and a vehicle location.

11. A computing system, comprising:
a plurality of speakers and a plurality of microphones;
a VPA system including a plurality of virtual personal assistant (VPA) instances, each VPA instance operating concurrently;
a plurality of audio zones, each audio zone including at least one speaker of the plurality of speakers and at least one microphone of the plurality of microphones;
a processor communicatively coupled to the computing system; and
a storage device storing instructions executable by the processor to:
assign the plurality of VPA instances to a plurality of users; and
broadcasting VPA responses to user requests, responsive to audio signal strengths of the plurality of microphones, from voice commands from the plurality of users, exceeding a threshold value.

12. The computing system of claim 11, wherein the computing system further comprises:
a user recognition system (URS) including a Mel Frequency Cepstral Coefficient feature extractor and a neural network for identifying a user based on an audio sample;
a virtual personal assistant (VPA) system including a speech-to-text (STT) engine, a language processor, and a text-to-speech (TTS) engine, and the plurality of VPA instances.

13. The computing system of claim 12, wherein the processor contains further instructions stored in a non-transitory memory that, when executed, cause the processor to:

assign a first VPA instance of the plurality of VPA instances to a first user of the plurality of users based on a voice command;
retrieve a VPA configuration for the first user from a remote server; and
broadcast a response from the first VPA instance via a speaker of the plurality of speakers.

14. The computing system of claim 13, wherein the computing system is included in a motor vehicle, and is communicatively coupled to at least one external device.

15. The computing system of claim 14, wherein the at least one external device includes one of a cloud-based service, a mobile phone, a tablet computer, a laptop computer, a desktop computer, a smart watch, a pair of smart glasses, and a server hosting one or more proprietary applications.

16. A method for providing virtual personal assistants (VPA) among a plurality of audio zones, comprising:
assigning a plurality of VPA instances to a plurality of users, each VPA instance of the plurality of VPA instances operating concurrently, wherein each of the plurality of users is located in one of the plurality of audio zones, wherein the plurality of audio zones comprises a first audio zone and a second audio zone, the first audio zone including a first microphone and a first speaker, and the second audio zone including a second microphone and a second speaker;
measuring a first audio signal strength corresponding to a first audio signal of the first microphone from a first voice command and a second audio signal strength corresponding to a second audio signal of the second microphone from the first voice command;
responsive to the first audio signal strength exceeding a threshold value and the second audio signal strength not exceeding the threshold value, assigning a first user to the first audio zone;
responsive to the first audio signal strength not exceeding the threshold value and the second audio signal strength exceeding the threshold value, assigning the first user to the second audio zone; and
responsive to each of the first audio signal strength and the second audio signal strength exceeding the threshold value, combining the first audio zone with the second audio zone.

* * * * *